US012589808B2

(12) United States Patent
Sviberg et al.

(10) Patent No.: US 12,589,808 B2
(45) Date of Patent: Mar. 31, 2026

(54) ROOF MODULE, MOTOR VEHICLE, AND METHOD FOR ASSEMBLING A MOTOR VEHICLE

(71) Applicant: Webasto SE, Stockdorf (DE)

(72) Inventors: Magnus Sviberg, Stockdorf (DE);
Maximilian Ehrmann, Stockdorf (DE);
Cèdric Langlais, Stockdorf (DE);
Michael Huelsen, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 416 days.

(21) Appl. No.: 18/172,464

(22) Filed: Feb. 22, 2023

(65) Prior Publication Data

US 2023/0278637 A1    Sep. 7, 2023

(30) Foreign Application Priority Data

Mar. 3, 2022    (DE) ..................... 10 2022 105 094.7

(51) Int. Cl.
B62D 25/06        (2006.01)
B62D 27/02        (2006.01)

(52) U.S. Cl.
CPC ........... B62D 25/06 (2013.01); B62D 27/023 (2013.01)

(58) Field of Classification Search
CPC .... B62D 25/06; B62D 27/023; B62D 27/026; B62D 27/065

USPC .......... 296/210, 216.01, 6, 218, 193.12, 3, 4
See application file for complete search history.

(56) References Cited

U.S. PATENT DOCUMENTS

| | | | | |
|---|---|---|---|---|
| 6,340,204 B1 * | 1/2002 | Seifert | ................... | B62D 25/06 |
| | | | | 296/210 |
| 10,569,721 B2 * | 2/2020 | Frederick | ............. | G05D 1/0231 |
| 11,731,705 B2 * | 8/2023 | Friedrich | ................ | B60R 16/02 |
| | | | | 296/210 |
| 2003/0159264 A1 * | 8/2003 | McLeod | ................ | B62D 65/04 |
| | | | | 29/428 |
| 2008/0106124 A1 * | 5/2008 | Snider | ................... | B60J 7/0015 |
| | | | | 296/215 |

FOREIGN PATENT DOCUMENTS

DE        102021104808 A1    9/2022

* cited by examiner

*Primary Examiner* — Dennis H Pedder
(74) *Attorney, Agent, or Firm* — Fitch, Even, Tabin & Flannery, LLP

(57)    ABSTRACT

A roof module having a panel component which at least partially forms a roof skin of a vehicle roof, the roof skin serving as an outer sealing surface of the roof module, and at least one electrical and/or electronic and/or electromagnetic component. The roof module may have at least one vehicle body rail configured to form at least part of a vehicle body roof frame when the roof module is disposed on a vehicle body.

18 Claims, 6 Drawing Sheets

| Producing the vehicle body |
| Painting the vehicle body |
| Providing the roof module |
| Arranging and attaching the roof module |
| ... |
| Attaching the front window and/or the rear window |
| ... |

(State of the art)

(State of the art)

(State of the art)

ROOF MODULE, MOTOR VEHICLE, AND METHOD FOR ASSEMBLING A MOTOR VEHICLE

CROSS-REFERENCE TO RELATED APPLICATION

This application claims priority from German Patent Application Number 10 2022 105 094.7, filed on Mar. 3, 2022, which is hereby incorporated herein by reference in its entirety for all purposes.

FIELD

The invention relates to a roof module for forming a vehicle roof of a motor vehicle according to the preamble of claim 1. Furthermore, the invention relates to a motor vehicle having such a roof module. Furthermore, the invention relates to a method for assembling a motor vehicle according to claim 12.

BACKGROUND

Generic motor vehicles are known from the state of the art. A generic roof module, which forms a vehicle roof of the motor vehicle on which it is disposed, can be prefabricated as a separate functional module and can be provided directly at the assembly line for the purpose of installation. The roof module at least partially forms a roof skin of the vehicle roof at its outer surface, the roof skin preventing moisture and air flows from entering the vehicle interior. The roof skin is composed of one or more panel components, which can be made of a stable material, such as painted metal or painted or solid-colored plastic. The roof module can be a part of a fixed vehicle roof or a part of an openable roof sub-assembly.

Furthermore, the development in vehicle manufacturing is increasingly focusing on autonomously and semi-autonomously driving motor vehicles. In order to enable the vehicle controller to control the motor vehicle autonomously or semi-autonomously, a plurality of electrical, electronic and/or electromagnetic are required, which are installed throughout the motor vehicle. These components can be environment sensors (e.g., lidar sensors, radar sensors, cameras, multi-cameras, etc. including other (electrical) components), which are configured to detect the environment surrounding the motor vehicle and to determine, for example, a current traffic situation from the detected environment data.

Furthermore, roof modules comprising a plurality of environment sensors for detecting a vehicle environment as fully as possible are known from the state of the art. Roof modules of this kind are referred to as roof sensor modules (RSM). The known environment sensors send and/or receive electromagnetic signals, such as laser beams or radar beams, allowing a data model of the vehicle environment to be generated by signal evaluation and to be used for controlling the vehicle.

In the state of the art, roof modules, in particular roof sensor modules, are installed on a vehicle body of a motor vehicle. An installation area for installing the roof module is defined by an opening which is limited, with respect to a longitudinal vehicle direction, by at least one front transverse rail or a header of the vehicle body (to which the windshield is attached), a rear transverse rail of the vehicle body (to which a rear window or a trunk lid is attached) and, with respect to a vehicle width direction, by two longitudinal rails of the vehicle body. The two transverse rails and the two longitudinal rails form a closed body roof frame as parts of the vehicle body.

In the state of the art, the windshield and/or the rear window are installed on the vehicle body before the roof module is installed on the vehicle body at the assembly line. The installation often takes place by gluing and/or foaming and/or injection-molding the window to a flange of the transverse rail. Polyurethane can be used for injection molding, for example. In other words, the windshield and/or the rear window are installed on the vehicle body, in particular glued to a flange of a transverse beam of the roof. Furthermore, vehicle doors (with or without a frame) and/or door windows are often installed on the body, for which purpose they have a direct point of intersection with the vehicle body and potential other side windows. Subsequently, the roof module is inserted, most commonly as a structural unit, into the opening and is connected to the transverse rails and the longitudinal rails of the vehicle body. Such a connection can be established by gluing or screwing, for example. Other components, such as a headliner, sun visors and/or roof operating units, are also installed on the vehicle body in other separate steps.

Such an approach to installing a roof module on a vehicle body and the technical construction of the vehicle body in combination with the roof modules are disadvantageous in various aspects. For example, a styling, a design and/or a package or packaging of a vehicle with a roof module are not ideal especially in the roof area in the state of the art since both the vehicle body and the roof module often have multiple identical technical components whose functional use at least partially overlaps. For instance, roof modules according to the state of the art often have a roof module frame which comprises at least one transverse rail and two longitudinal rails and via which the roof module is mounted on the vehicle body or the vehicle roof frame. The redundancy of components poses a problem (also called matching problem) with regard to stiffness and/or strength requirements and with regard to desired tolerances, which can be disadvantageous in particular when the components in question are connected to each other. Moreover, the redundancy of components leads to an increase in weight of the overall vehicle, which disadvantageously affects not only its energy consumption. Also, it is not possible to reliably fulfil desired installation space requirements, which has a negative effect on the planning of a packaging for the vehicle in question. Additionally, there are multiple components forming a roof skin in some areas of the vehicle roof, which leads to overlap issues with regard to a required visual appearance, color and/or optical harmonization. Furthermore, the order of the vehicle assembly described above is disadvantageous since it is not adaptive and often multiple technical systems and/or components have to be installed on the vehicle separately and one after the other. This takes a lot of time and is accompanied by high installation costs. Moreover, the desired modularity during the production process and in the resulting product is not achieved. Furthermore, an installation during vehicle assembly is also not ideal in the state of the art since the order of the installation steps is not adaptive. Moreover, multiple systems and components have to be installed on the vehicle separately and one after the other. This, too, is detrimental to a modularity of the production process and the resulting product (motor vehicle). Also, the production costs and the resulting total weight require optimization in the state of the art. For example, the large lateral body parts, which comprise the A-, B-, C- and/or D-pillar(s), are particularly complex with regard to their technical structure and cause high costs.

SUMMARY

Hence, an object of the invention is to enhance a method for assembling a motor vehicle in such a manner that the disadvantages of the state of the art mentioned above are overcome and, in particular, that components and therefore weight and production costs can be saved.

This object is attained by a roof module according to the teaching of claim 1. Furthermore, the object is attained by a motor vehicle according to the teaching of claim 10. Also, the object is attained by a method for assembling a motor vehicle according to the teaching of claim 12.

Advantageous embodiments of the invention are the subject matter of the dependent claims. Moreover, any and all combinations of at least two features disclosed in the description, the claims, and/or the figures fall within the scope of the invention. Naturally, the explanations given in connection with the roof module equivalently relate to the motor vehicle according to the invention without being mentioned separately in its context. Moreover, illustrative examples and embodiments described in reference to the roof module according to claim 1 naturally relate equivalently, albeit not verbatim, to the method according to claim 11 without being explicitly mentioned in its context. In particular, linguistically common rephrasing and/or an analogous replacement of respective terms within the scope of common linguistic practice, in particular the use of synonyms backed by the generally recognized linguistic literature, are of course comprised by the content of the disclosure at hand without every variation having to be expressly mentioned.

The roof module according to the invention comprises a panel component which at least partially forms a roof skin of a vehicle roof, the roof skin serving as an outer sealing surface of the roof module, and at least one electrical and/or electronic and/or electromagnetic component. The roof module according to the invention is characterized in that it comprises at least one vehicle body rail or a vehicle body beam configured to form at least part of a vehicle body roof frame when the roof module is disposed on a vehicle body.

The method according to the invention for assembling a motor vehicle comprises at least the following steps: providing a vehicle body having at least one longitudinal rail and/or at least one transverse rail forming at least part of a vehicle body roof frame; providing a roof module comprising a panel component which at least partially forms a roof skin of a vehicle roof, the roof skin serving as an outer sealing surface of the roof module, and at least one vehicle body rail; arranging the roof module on the vehicle body in such a manner that the at least one vehicle body rail and the at least one longitudinal rail and/or the at least one transverse rail together form the vehicle body roof frame; and attaching the at least one vehicle body rail to the at least one longitudinal rail and/or the at least one transverse rail.

Furthermore, the invention relates to a motor vehicle comprising a vehicle body having at least one longitudinal rail and/or at least one transverse rail, which forms at least part of a vehicle body roof frame, and/or a vehicle body substructure and any embodiment of a roof module according to the invention. The at least one vehicle body rail is connected, in particular screwed and/or welded and/or glued, to the at least one longitudinal rail and/or the at least one transverse rail, which at least partially forms the vehicle body roof frame, and/or to the vehicle body substructure.

The term "vehicle body substructure" as used herein preferably refers to a vehicle body from which no A-pillar and/or B-pillar and/or C-pillar and/or D-pillar protrudes. Thus, the term "vehicle body substructure" preferably describes a vehicle body without a roof area and/or without an aquarium.

So according to the invention, the vehicle body does not have a closed vehicle roof frame; instead, at least part of the vehicle roof frame, namely the at least one vehicle body rail, is comprised in the roof module according to the invention. Thus, the vehicle roof frame is not complete, for example, until the roof module has been placed on top of the vehicle body and/or arranged thereon and in particular connected thereto. Moreover, it is possible for the entire body roof frame, i.e., multiple vehicle body rails, to be comprised in the roof module according to the invention, which means that the vehicle body no longer comprises its own roof frame unlike in the state of the art. In principle, it is also possible for the roof module according to the invention to be connected to the vehicle body from below (bottom load arrangement) or laterally. This has advantages both with regard to the production method for assembling a motor vehicle and with regard to the amount of components required overall. After all, a separate roof module frame, which has been provided for installing the roof module on the vehicle body in the state of the art, is preferably no longer needed since the at least one vehicle body rail is provided on the roof module. According to the invention, the roof module frame is at least partially replaced by the at least one vehicle body rail with the result that predetermined stiffness and/or strength requirements posed on the roof module by design are still fulfilled. As another result of the solution according to the invention, at least part of the body roof frame of the vehicle body can be dispensed with since this part is comprised in the roof module. Thus, components, such as at least parts of the roof module frame, can be saved overall. This leads to a reduction in weight and costs.

Moreover, it is also conceivable for at least part of an A-pillar and/or a B-pillar and/or a C-pillar and/or a D-pillar to be comprised in the roof module in addition to the at least one vehicle body rail. Also, it may be preferred for the roof module according to the invention to comprise at least one window, in particular a windshield, a rear window and/or side windows, which have been pre-installed on, in particular glued to, the roof module before the roof module is arranged on the vehicle body in order to be attached thereto. In other words, the roof module according to the invention can comprise at least one A-pillar and/or one B-pillar and/or one C-pillar and/or one D-pillar of a vehicle body and/or a front window and/or a rear window and/or at least one side window in an embodiment. This "augmented" roof module is preferably arranged on the vehicle body as an installation unit. In a preceding installation step or a subsequent installation step, vehicle doors are preferably installed on the vehicle body. The integration of the vehicle roof and the aquarium in the roof module additionally makes certain components unnecessary or allows them to be integrated in other components, in particular by functional and/or component integration. This has a positive effect on the resulting total weight and the production costs. Moreover, the vehicle assembly can be optimized since a plurality of technical systems and/or components can be pre-installed on the roof module according to the invention. As a result, the roof module can preferably be supplied as a delivery unit (ready-to-assemble). This permits a higher degree of flexibility in vehicle manufacturing, which is accompanied by undreamed-of benefits to the customer. With such an architecture, in particular by integrating the vehicle roof and the aquarium in the roof module, constructive changes to the configuration are also possible at a later point. An additional advantage arises from the modular structure of the motor vehicle equipped with the roof module according to the invention since different roof modules can be arranged on the same body understructure, for example. Thus, different roof options, such as a fixed roof, a panoramic roof, a folding top, for one vehicle can be offered to the customer.

In other words, the at least one vehicle body rail, which forms the transverse beam for arranging the windshield and/or the transverse beam for arranging the rear window (or a rear wall door) and/or the longitudinal beam for arranging a side window, for example, is comprised in the roof module or the roof sensor module according to the invention. The at least one vehicle body rail can be comprised in the roof module as a separate component or as a part of the roof module. So the invention proposes an augmented roof module which can be arranged on the vehicle body of a motor vehicle as a whole. The vehicle body preferably has no additional body rail or body transverse beam at least in an area of the vehicle roof frame in which the at least one vehicle body rail is disposed when the roof module is disposed on the vehicle body, which means that components can be saved overall. Alternatively, it is conceivable for the vehicle body to only have a simplified body rail in the area in question, in which the at least one vehicle body rail is disposed, said simplified body rail merely serving as a guiding structure for arranging the roof module on the vehicle body in a guided manner and having only a marginal support function itself within the vehicle body, for example. So the at least one vehicle body rail does not form an integral part of the vehicle body and/or the body roof frame unlike in the state of the art.

The method according to the invention is characterized in that, for example, an order of installing the roof module is changed and simplified overall compared to a roof module installation in the state of the art. For instance, the roof module according to the invention is arranged on and attached to the vehicle body before the front window or the windshield and/or the rear window and/or the side window(s) is/are attached to the vehicle body. This is not the case in the state of the art since there the windows in question are arranged on the vehicle body before the roof module is arranged on and attached to the vehicle body. So according to the invention, at least one of the windows in question (windshield and/or rear window and/or side window) is attached to a part of the roof module, namely the at least one vehicle body rail, and connected thereto. Thus, the roof module or the at least one vehicle body rail provides an attachment flange for attaching the window in question. In the state of the art, this attachment flange has been provided by an integral part of the vehicle body.

Thus, a plurality of advantages are realized according to the invention. For example, a design or a layout and/or a packaging or a package of the vehicle, in particular in the roof area, can be improved and in particular made more effective since fewer components are required compared to the state of the art, which means that a higher degree of installation space flexibility is available. This results in a higher degree of freedom of design for a vehicle styling. Moreover, an interior of the vehicle and/or an installation space for a panoramic roof and/or a sunroof increases. This can improve how the space feels to a user. Likewise, the provision of the at least one vehicle body rail according to the invention allows a more effective configuration or an optimization of a positioning and/or a placement of the at least one component. For instance, a measuring precision within a field of view (FOV) of an environment sensor can be optimized by arranging it on the at least one vehicle body rail. Compared to the state of the art, such a placement has the advantage that no material-related mechanical stress between the vehicle body and a roof module frame, for example, have to be compensated for since the environment sensor has to be calibrated merely with respect to its placement on the at least one vehicle body rail. On the other hand, there is no longer any stress-related warping between vehicle body and the roof module. Therefore, the measuring precision can be improved, which leads to an improvement of an overall safety of the vehicle. Moreover, the arrangement and/or integration of the at least one vehicle body rail on the roof module according to the invention renders certain components unnecessary or allows them to be integrated in other components, in particular by functional and/or component integration. This has a positive effect on a total weight of the vehicle and the material- and production-related costs. Moreover, the vehicle assembly can be optimized, as described above.

The expression "at least one" as used herein means that the motor vehicle according to the invention can comprise one or more than one such component. Moreover, it is noted that the expression "at least one electrical, electronic and/or electromagnetic component" is used equivalently to the shortened expression "at least one component" in this description. Of course, the roof module according to embodiments of the invention can have multiple electrical, electronic and/or electromagnetic components which in particular have different functions. The at least one vehicle body rail according to the invention can preferably be beam-shaped and can in particular have a hollow cross section. The length of at least one vehicle body rail according to the invention is preferably greater than its width and/or height.

The roof module according to the invention can form a structural unit in which features for autonomous or semi-autonomous driving assisted by driver assistance systems are integrated and which can be placed and/or arranged on a vehicle carcass as a unit by a vehicle manufacturer. Furthermore, the roof module according to the invention can be a purely fixed roof or a roof including a roof opening system. Moreover, the roof module can be configured for use with a passenger car or a utility vehicle. Alternatively or additionally (i.e., and/or), it is preferred for the roof module to comprise one or more than one see-through area, such as an at least partially transparent fixed roof element, in order to optimize a daylight concept in a vehicle interior. Alternatively or additionally, however, such a see-through area can also be a see-through area of an environment sensor, through which the environment sensor looks and can in particular send and/or receive electromagnetic signals in order to detect a vehicle environment.

Also, the motor vehicle according to the invention can of course comprise multiple roof modules which at least partially form a roof skin of the motor vehicle and/or which are disposed at least in a roof area of the motor vehicle, such as an area of a longitudinal rail and/or a transverse rail of a vehicle roof frame of the motor vehicle. For example, such roof modules according to the invention may cover only a portion of the vehicle roof. Thus, roof modules of this kind do not form a continuous roof skin or a continuous vehicle roof of the motor vehicle.

According to a preferred embodiment, the at least one vehicle body rail or the at least one vehicle body beam forms a front transverse rail or transverse beam of the vehicle body roof frame, in particular a front header, with respect to a longitudinal vehicle direction, in particular when the roof module is disposed on the vehicle body. The transverse rail or transverse beam is preferably orthogonal and horizontal to the longitudinal vehicle direction. According to this embodiment, the vehicle body or the vehicle roof frame of the vehicle body does not have a front header. After all, the front header is comprised in the roof module and/or forms a part of a roof module frame.

According to a preferred embodiment, the at least one vehicle body rail forms a rear transverse rail or transverse beam of the vehicle body roof frame with respect to the longitudinal vehicle direction, in particular when the roof module is disposed on the vehicle body. The rear transverse rail or transverse beam is preferably orthogonal and horizontal to the longitudinal vehicle direction. The rear transverse beam is preferably parallel to the front header. According to this embodiment, the vehicle body or the vehicle roof frame of the vehicle body does not have a rear header. After all, the rear header is comprised in the roof module and/or forms a part of a roof module frame.

According to a preferred embodiment, the at least one vehicle body rail forms a longitudinal rail, in particular a longitudinal beam, of the vehicle body roof frame with respect to a vehicle width direction. The longitudinal beam or longitudinal rail is preferably essentially (±10%) orthogonal to the front and rear transverse rails and forms an in particular essentially (±10%) horizontal body roof frame structure, preferably together with at least one transverse rail, when the roof module is in the installed state. Alternatively or additionally to the transverse beam mentioned above, the at least one vehicle body rail can form at least one longitudinal rail which is comprised in the roof module or the roof sensor module according to the invention as a separate component or as an integral part, for example. For instance, the longitudinal rail can be formed integrally on the panel component. Such a longitudinal rail preferably forms at least part of the roof frame. According to the invention, this augmented roof sensor module can be arranged on the vehicle body, which preferably has no longitudinal rails or has constructively simplified longitudinal rails in the roof area. Subsequently, at least one side window can preferably be installed on the vehicle body, on which the roof module is disposed, as opposed to the state of the art. In this case, side doors and/or door windows installed on the vehicle body have a point of intersection with both the vehicle body and the roof sensor module. In the state of the art, the side doors and/or the door windows had a point of intersection with the vehicle body only. Thus, the complex side parts of the body can particularly preferably be simplified significantly and can be provided at least partially by the roof module. This can reduce the production costs.

Particularly preferably, the roof module comprises at least two transverse rails or transverse beams, one of which forms the front header and the other one of which forms the rear transverse beam when the roof module is disposed on and/or attached to the vehicle body. In principle, it is also possible for the roof module to comprise three or more transverse rails which form a vehicle roof frame together with the at least one longitudinal rail of the vehicle body. The vehicle body preferably has two longitudinal rails, which are each preferably essentially (i.e., ±10%) parallel to the longitudinal vehicle direction. Of course, all rails, in particular the transverse and/or longitudinal rails mentioned above, can also be bent and/or arced and/or curved as an alternative to a straight shape. So the rails can be disposed in such a manner that they are oriented along the longitudinal or transverse direction or along the longitudinal vehicle direction or the vehicle width direction while having a changing shape and/or a changing cross section per se, in particular orthogonal to their longitudinal orientation. The longitudinal vehicle direction is preferably orthogonal to the vehicle width direction.

According to another embodiment, it is basically possible for the roof module to have an in particular closed vehicle roof frame comprising two parallel and/or mirror-symmetrical longitudinal rails and two parallel and/or mirror-symmetrical transverse rails, which are each essentially (i.e., ±10%) orthogonal to the two longitudinal rails. In particular in the case of rails having a bent and/or arced and/or curved shape, a mirror-symmetrical orientation, in particular of opposite rails, is advantageous. So in such a case, the vehicle body has no longitudinal rail at the top. Instead, the motor vehicle claimed according to the invention has a vehicle body and a roof module according to the invention, which comprises the vehicle roof frame, in this case. The vehicle body is configured to be installed on and/or connected, in particular screwed and/or welded and/or glued and/or foamed and/or injection-molded, to the roof module. The vehicle roof frame comprised in the roof module will form the vehicle roof frame of the vehicle body on the whole when the roof module is in the installed state. The vehicle body preferably comprises at least one A-pillar and at least one C-pillar on the right and on the left with respect to the longitudinal vehicle direction, i.e., a total of four pillars, on which the vehicle roof frame of the roof module can be mounted.

According to a preferred embodiment, the at least one vehicle body rail is welded and/or screwed and/or bolted and/or glued and/or foamed and/or injection-molded at least to a part of the roof module or formed, in particular integrally, at least by a part of the roof module. Other attachment methods, which are not explicitly mentioned here, are possible in principle, as well.

According to a preferred embodiment, the at least one vehicle body rail is disposed directly or indirectly on the panel component. Alternatively, the at least one vehicle body rail is disposed directly or indirectly on a roof module frame of the roof module. Alternatively or additionally (i.e., and/or), the at least one vehicle body rail is formed by part of the roof module frame or by the panel component. For example, the at least one vehicle body rail can be connected to the panel component of the roof module or to at least part of the roof module frame of the roof module directly (i.e., without additional installation components) or directly (i.e., via one or more than one installation component). Alternatively, the at least one vehicle body rail can also be formed by part of the roof module. For example, the panel component can be shaped in such a manner that at least part of it forms a beam-shaped hollow structure, which forms the at least one vehicle body rail. Such a shape of the panel component can be achieved by deep drawing, for example. The hollow structure shaped in this manner can be constructively configured in such a manner that the requirements posed on a vehicle body in terms of stiffness and/or strength and/or elasticity, in particular in case of a collision, are fulfilled.

According to a preferred embodiment, the at least one electrical, electronic and/or electromagnetic component comprises an antenna and/or a measuring sensor and/or a communication feature and/or a light feature and/or an environment sensor, in particular a lidar sensor and/or a radar sensor and/or a camera sensor and/or a multi-camera sensor and/or an ultrasonic sensor. Of course, the component can also comprise more than one of each of the mentioned components. The antenna can be an electrical or magnetic antenna. The measuring sensor can be a temperature sensor, a humidity sensor, a GPS sensor, an acceleration sensor and/or a similar measuring sensor, for example. The communication feature can be a WLAN interface, an LTE interface or another near-, medium- or long-range communication interface. The communication feature allows the motor vehicle to communicate with a vehicle environment and in particular send and/or receive data. The light feature can comprise one or more than one light. The lights are in particular configured to indicate a (semi-)autonomous driving mode and/or different driving mode situations of the motor vehicle. The environment sensor according to the invention can basically be configured in various ways and can comprise a lidar sensor, a radar sensor, an optical sensor, such as a camera or a multi-camera, an ultrasonic sensor and/or the like. Lidar sensors, for example, operate in a wavelength range of 905 nm or approximately 1550 nm. A material in a see-through area of the environment sensor is preferably transparent to a wavelength range used by the environment sensor and is selected as a function of the wavelength(s) used by the environment sensor. Of course, merely a signal detection unit, such as an optical sensor and/or a fotochip, may be disposed on the vehicle body. Evaluation electronics, in particular referred to as a camera control unit (CCU), which is configured to evaluate the signals detected by the optical sensor, can be disposed separately therefrom in another area of the motor vehicle, for example. Particularly preferably, the at least one component is disposed on or integrated in the at least one vehicle body rail.

According to a preferred embodiment, the roof module comprises at least one cleaning feature and/or a temperature control feature (i.e., a cooling feature and/or a heating feature) and/or a control feature and/or an amplifying feature and/or an optical feature and/or a communication interface and/or an energy generation feature and/or an energy storage feature and/or a roof headliner and/or at least one handle element and/or at least one airbag and/or a roof operating feature and/or a cover, which is preferably at least partially disposed on or integrated in the at least one vehicle body rail. Other technical components and/or functional features, which are not mentioned here, can also be comprised in the roof module and can preferably be disposed, in particular pre-installed, on the at least one vehicle body rail. Thus, it is possible for the roof module including a plurality of technical components, all of which had to be installed on the vehicle body separately after the roof module had been arranged on the vehicle body in the state of the art, to be pre-installed thereon so that the roof module can be provided as an augmented functional unit. Thus, an OEM can be provided with a fully assembled roof module, in particular with pre-installed interior equipment, at the assembly line, which allows the OEM to save a plurality of production steps.

A preferred cleaning feature of this kind preferably comprises at least one cleaning nozzle for cleaning a see-through area through which the at least one component, in particular a measuring sensor and/or an environment sensor, looks, and/or at least one wiper for cleaning a see-through area through which the at least one component, in particular a measuring sensor and/or an environment sensor, looks, and/or one or more than one connecting line for supplying a cleaning fluid. The cleaning feature is preferably connected to a tank, which can be disposed anywhere in the motor vehicle. The cleaning fluid can be a liquid, a gas and/or pressurized air. The cleaning feature is configured to clean a see-through area through which the at least one component, in particular a measuring sensor and/or an environment sensor, looks. This supports or improves the function of the at least one component since the at least one component, which is in particular an environment sensor and/or a measuring sensor, can operate without interruption as dirt is effectively removed from the see-through area.

A temperature control feature of this kind preferably comprises at least one heat conduction channel or a cooling channel (see descriptions above) and/or at least one heat transfer element and/or at least one fan and/or at least one heat exchanger and/or at least one heat conduction pipe (also referred to as a heat pipe). The temperature control feature is configured to air-condition or control the temperature of the at least one component (i.e., to keep it at a predetermined (operating) temperature). For providing this additional temperature control function for the at least one component, the temperature control feature is preferably connected to the at least one component via at least one heat conduction interface when the roof module is disposed on the vehicle body. This provides a temperature control function of the at least one component, which ensures the reliability of the at least one component during operation and in particular prevents the at least one component from overheating. The temperature control feature preferably keeps the at least one component at a predetermined operating temperature.

A control feature of this kind can preferably control one or more than one function of the at least one component. In particular, the control feature can execute software that controls the function or multiple functions of the at least one component by means of a processor, for example. For example, the control feature can also receive software updates, e.g., via a communication interface of the motor vehicle (see also the explanations above), so that a range of functions of the at least one component can be extended by such a software update. The control feature can also extend a range of functions of the at least one component by providing extended control functions that cannot be executed by a controller of the component itself, for example. The control feature preferably allows extending a range of functions of the at least one component in the course of a retrofit.

An amplifying feature of this kind can preferably be configured to amplify a transmitting power and/or a receiving power of the at least one component and thus improve the performance of the at least one component. The amplifying feature can comprise a signal amplifier or the like, for example.

An optical device of this kind can comprise a see-through area in the form of a window and/or a lens and/or another type of optical element, for example. The optical feature is preferably configured to provide a see-through area for the at least one component, which is in particular an environment sensor and/or a measuring sensor, through which the at least one component can look in order to receive electromagnetic and/or optical signals from a vehicle environment and/or send electromagnetic and/or optical signals into the vehicle environment. The optical feature can be configured to extend a field of view or an angle of view of the at least one component and/or limit the same to a predetermined detection area. This can be done by means of a lens or a similar optical element, for example. In the simplest case, the optical feature can comprise a window through which the at least one component can look. In such a case, it is preferred for the at least one component and/or a housing in which the at least one component is disposed not to comprise a see-through area so as to ensure that the at least one component looks through a single window or a single see-through area in order to detect the vehicle environment. This allows reducing detection losses that occur when sending and/or receiving electromagnetic signals because of a penetration of the see-through area even though it is transparent to predetermined wavelengths.

A communication interface of this kind can preferably be configured to receive data from outside the motor vehicle and/or send data to a vehicle environment. For example, the communication interface can be configured to communicate with a server or a cloud from which data can be retrieved and/or on or in which data can be stored. For example, the communication interface can be a WLAN interface and/or a radio interface and/or a GPS interface and/or a Bluetooth interface.

An energy generation feature of this kind can be configured to generate the electrical energy required for operating the at least one component or convert it into electrical energy from another form of energy (e.g., solar energy), for example. The energy generation feature can comprise at least one photovoltaic cell, for example, by means of which the solar energy can be converted into electrical energy. The energy generation feature preferably comprises power electronics and/or a DC/DC converter and/or an AC/DC converter. Thus, a required voltage level or power level can preferably be provided in a manner specific to the component. The energy generation feature is preferably disposed in a roof area of the panel component. The energy generation feature can provide energy required for the electrical system of the vehicle and/or for the at least one component with the result that an energy storage (e.g., a traction battery) required for driving the motor vehicle is relieved, leaving the motor vehicle with a greater range, for example.

An energy storage feature of this kind can be a battery and/or a super capacitor, for example. This allows energy generated by the preferred energy generation feature to be temporarily stored in order to supply the at least one component with energy even when the energy generation feature cannot generate energy, for example. In principle, it is also possible that the roof module merely comprises a battery management system and other parts of the energy storage feature, such as the battery cells and/or the super capacitors, are comprised in other areas of the motor vehicle.

According to a preferred embodiment, the roof module is disposed on a vehicle roof frame of the vehicle body as a structural unit. The roof module can preferably be glued, screwed and/or welded to the at least one longitudinal rail or longitudinal beam of the vehicle roof frame of the vehicle body.

According to a preferred embodiment of the motor vehicle according to the invention, the vehicle body roof frame of the vehicle body forms an in particular closed frame structure when the roof module is disposed on the vehicle body. So the vehicle body roof frame is not an integral part of the vehicle body like in the state of the art; it is not complete until the roof module has been arranged on and attached to the vehicle body. Instead, part of the vehicle body is now part of the roof module and comprised therein, which means that the vehicle body comprises fewer components at least in the roof area compared to the state of the art.

According to a preferred embodiment of the method according to the invention, the attaching step comprises at least gluing the at least one vehicle body rail to the at least one longitudinal rail and/or the at least one transverse rail. Gluing the vehicle body rail to the at least one longitudinal rail and/or the at least one transverse rail is particularly simple to implement in manufacturing and takes little installation time. Preferably, a glue bead merely needs to be disposed on the at least one longitudinal rail and/or the at least one transverse rail, the glue bead interacting with the at least one vehicle body rail in such a manner when the roof module is placed and/or arranged on the vehicle body that the at least one vehicle body rail is attached to the at least one longitudinal rail and/or the at least one transverse rail in a preferably reversible manner. After the placement of the roof module on the vehicle body or during the arrangement of the roof module on the vehicle body, the installation preferably provides a rest time or a hardening time in which the glued connection can harden so as to avoid a displacement or shifting of the roof module relative to the vehicle body.

According to a preferred embodiment of the method according to the invention, the method further comprises the step of attaching, in particular gluing, a front and/or rear windshield and/or a side window to the vehicle body and the at least one vehicle body rail. According to the invention, this step is preferably carried out after the roof module has been placed on and attached to and joined with the vehicle body since a part of the roof module, namely a part of the at least one vehicle body rail, serves as an installation flange for installing the front and/or rear windshield and/or the side window(s). The installation flange provided by the at least one vehicle body rail preferably serves to dispose a glue bead by means of which the windshield in question can be attached thereto. Preferably, a glue bead is provided on the vehicle body including the vehicle body rail, which preferably continuously surrounds an opening into which the windshield in question is inserted.

According to a preferred embodiment of the method according to the invention, the method further comprises the step of pre-installing further technical systems and/or components, in particular a headliner, at least one sun visor and/or a roof operating unit, on the roof module and/or the at least one vehicle body rail. According to the invention, it is additionally advantageous if further technical systems and/or components, such as a headliner, a sun visor and/or a roof operating unit, are pre-installed on the roof module. Thus, the roof module can be particularly advantageously be installed on the vehicle body as an entire module including the systems and/or components. Compared to the state of the art, this offers the advantage that the systems and/or components in question no longer have to be installed by separate production steps; instead, a roof module according to the invention can be provided to an original equipment manufacturer (OEM) in a pre-assembled state, which allows the OEM to save a plurality of production steps. Particularly preferably, such a roof module including the multiple technical systems and/or components can be supplied to the assembly line for the vehicle assembly as a delivery module or a delivery unit, in particular in the form of a ready-to-assemble unit.

Of course, the embodiments and the illustrative examples mentioned above and yet to be discussed below can be realized not only individually but also in any combination with each other without departing from the scope of the present invention. Moreover, the embodiments and illustrative examples mentioned above and yet to be discussed below equivalently or at least similarly relate to the roof module according to the invention without being mentioned separately in its context.

BRIEF DESCRIPTIONS OF THE DRAWINGS

Embodiments of the invention are schematically illustrated in the drawings and will be discussed as examples below.

DETAILED DESCRIPTION

Figure 1:
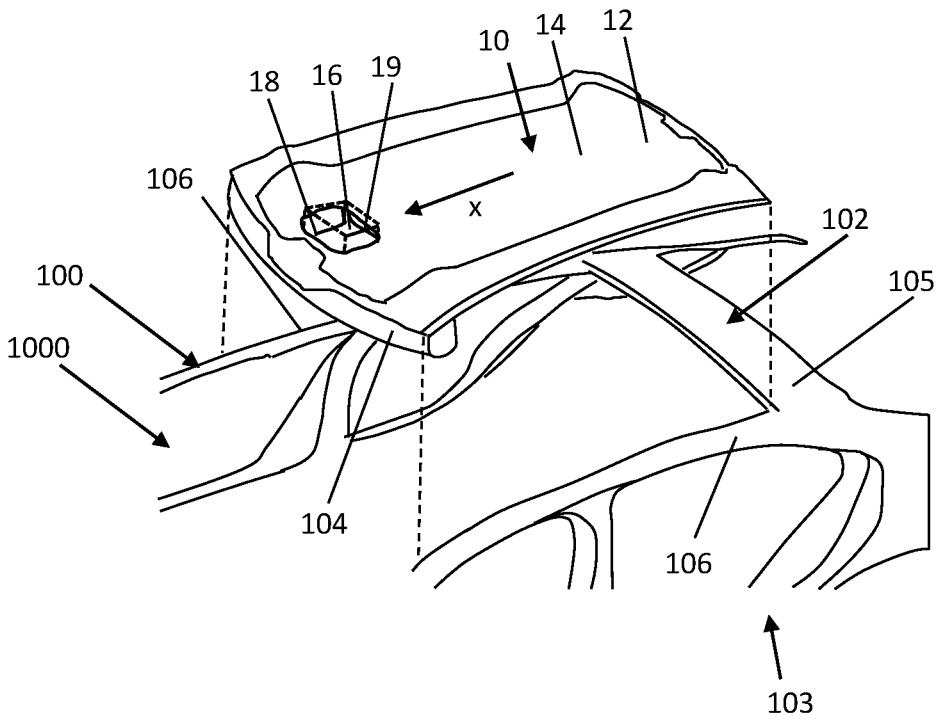
FIG. 1 is a first schematic view of a motor vehicle having a vehicle body and a roof module.

FIG. 1 shows a motor vehicle 1000 having a vehicle roof 100. In the case at hand, vehicle roof 100 is formed by a roof module 10. Roof module 10 can be placed and/or arranged on a part of a vehicle roof frame 102 of a vehicle body 103 as a structural unit. This is schematically indicated by dashed lines. Roof module 10 comprises a panel component 12 for forming a roof skin 14 of vehicle roof 100. An electrical and/or electronic and/or electromagnetic component 16 is disposed in a front center roof area of roof module 10 with respect to a longitudinal vehicle direction x.

Figure 2:
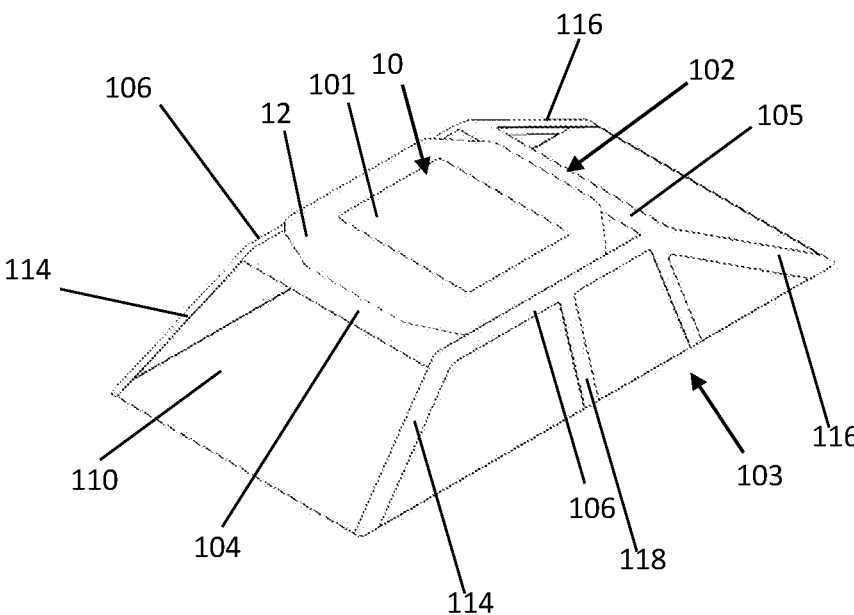
FIG. 2 is a second schematic view of a motor vehicle having a vehicle body and a roof module.

According to the invention, roof module 10 comprises at least one vehicle body rail 104. In the case of FIGS. 1 and 2, the at least one vehicle body rail 104 forms a front transverse rail or transverse beam, which defines a roof header of motor vehicle 1000, with respect to longitudinal vehicle direction x. In the case of FIG. 1, the at least one vehicle body rail 104 is formed by panel component 12. In the case of FIG. 2, the at least one vehicle body rail 104 is disposed on or attached to roof module 10 as a separate component. The roof module 10 according to FIG. 2 has a panoramic roof and/or a sunroof 101 as an example.

In the case of FIGS. 1 and 2, vehicle body 103 comprises a rear transverse rail 105 with respect to longitudinal vehicle direction x and two longitudinal rails 106, which are parallel to each other and longitudinal vehicle direction x. Transverse rail 105 and the two longitudinal rails 106 or side rails form part of vehicle roof frame 102. When roof module 10 is being arranged on vehicle body 103, the at least one vehicle body rail 104 is attached, in particular glued and/or foamed and/or injection-molded, to the at least one longitudinal rail 106; in the case at hand, it is attached to both longitudinal rails 106. In the installed state of roof module

10, i.e., when roof module 10 is disposed on and connected to vehicle body 103, vehicle body rail 104, rear transverse rail 105 and the two longitudinal rails 106 together form vehicle roof frame 102, in particular as a closed frame structure. In other exemplary embodiments, rear transverse rail 105 can be comprised in roof module 10, in which case explanations made with regard to vehicle body rail 104 equivalently relate to transverse rail 105. So the roof module 10 according to this embodiment can be inserted into a roof opening formed between longitudinal rails 106 of the vehicle body as a structural unit and can be connected, in particular glued and/or foamed and/or injection-molded, to longitudinal rails 106 and to respective A-pillars 114 and C-pillars 116 at the front and at the rear (with respect to a direction of travel x). Depending on the vehicle configuration, reference sign 116 can also designate a D-pillar.

Figure 3:
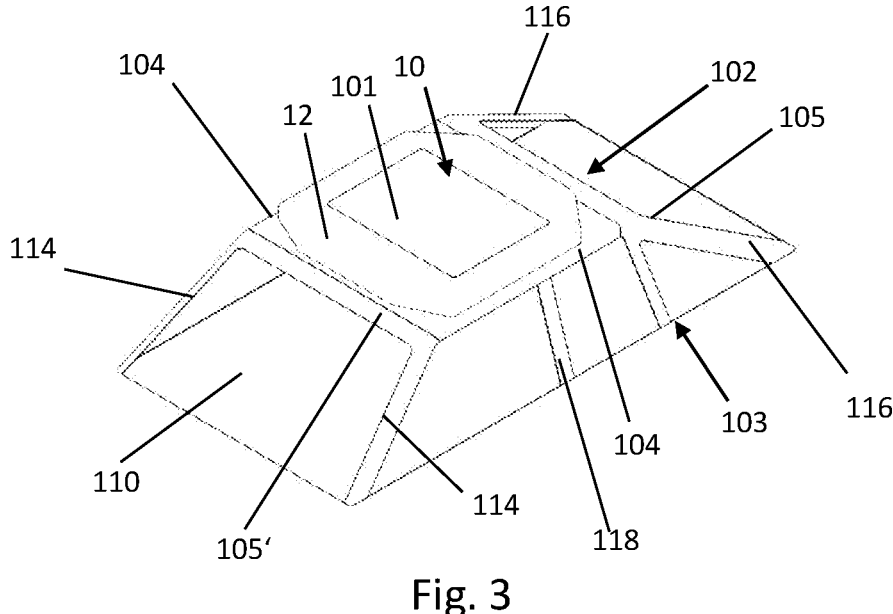
FIG. 3 is a third schematic view of a motor vehicle having a vehicle body and a roof module.
Figure 4:
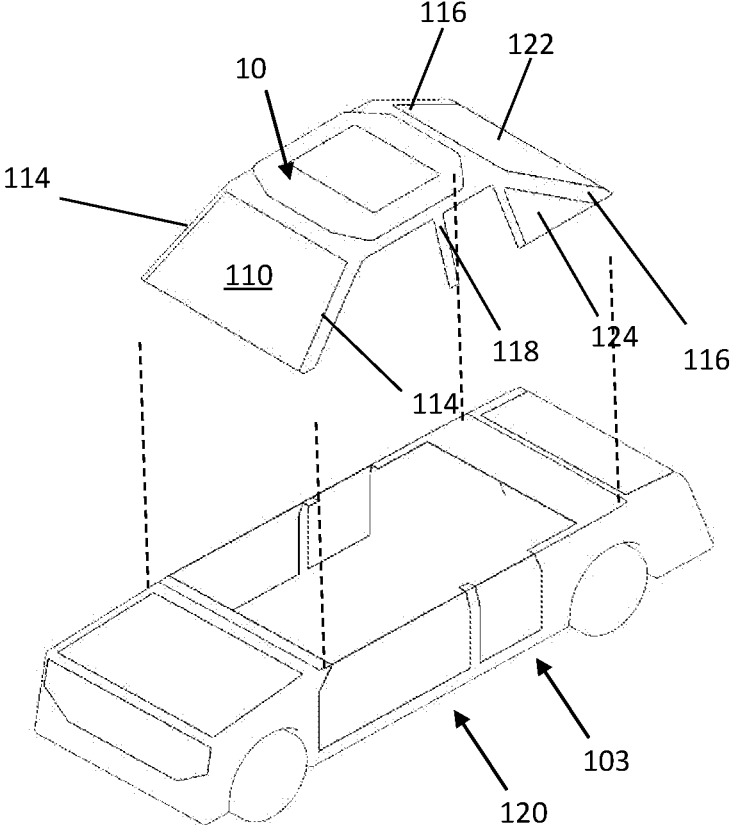
FIG. 4 is an exploded illustration showing a fourth schematic view of a motor vehicle having a vehicle body and a roof module.
Figure 5:
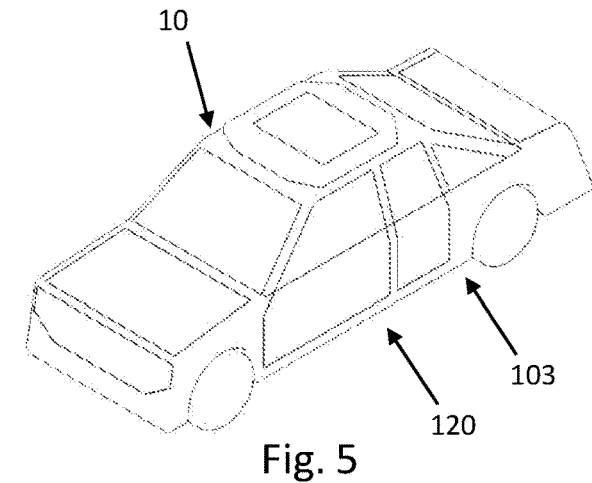
FIG. 5 shows the fourth schematic view of a motor vehicle having a vehicle body and a roof module in an assembled state.

According to FIG. 3, the at least one vehicle body rail 104 is realized as longitudinal rails, which means that vehicle body 103 only has transverse rails 105' and 105 in the roof area. Longitudinal rails 106 and the two vehicle body rails 104 are comprised in roof module 10 and each disposed thereon as separate components. So the roof module 10 according to this configuration can be inserted into a roof opening formed between front and rear transverse rails 105 and 105' as a structural unit and can be connected, in particular glued and/or foamed and/or injection-molded, to transverse rails 105 and 105' and to respective B-pillars 118 on the right and on the left (with respect to direction of travel x). In the exemplary embodiment shown in FIG. 4, the at least one vehicle body rail 104 comprised by roof module 10 can also have both transverse rails 105 and 105', both longitudinal rails 106, which means that entire vehicle roof frame 102, which is in particular closed, is comprised by roof module 10. Furthermore, roof module 10 can additionally comprise A-pillars 114, B-pillars 118 and C-pillars 116, which protrude from roof frame 102, which is comprised in roof module 10, in the direction of the bottom, as in the exemplary embodiment shown in FIGS. 4 and 5. A roof module 10 configured in this manner can be placed on a vehicle body substructure 120 as an augmented roof module 10 and can be connected thereto as a unit. This is illustrated by dashed lines in FIG. 4. A roof module 10 augmented in this manner can preferably also comprise windshield 110 and/or rear window 122 and/or at least one side window 124 (see FIG. 4).

Electrical and/or electronic and/or electromagnetic component 16 comprises an environment sensor 18, which is a lidar sensor in the case at hand. Other sensor types, such as (multi-directional) cameras and/or ultrasonic sensors, can be employed, as well. Furthermore, electrical and/or electronic and/or electromagnetic component 16 comprises a housing 19, in which environment sensor 18 is at least partially (completely and in a moisture-proof manner in the case at hand) disposed. In the case at hand, housing 19 is disposed on panel component 12 rigidly or in a retractable and deployable manner. However, housing 19 can also be a partial housing or a housing portion. Environment sensor 18 is configured to send and/or receive electromagnetic signals in order to detect a vehicle environment of motor vehicle 1000 (e.g., for autonomous driving or parking).

Figure 6:
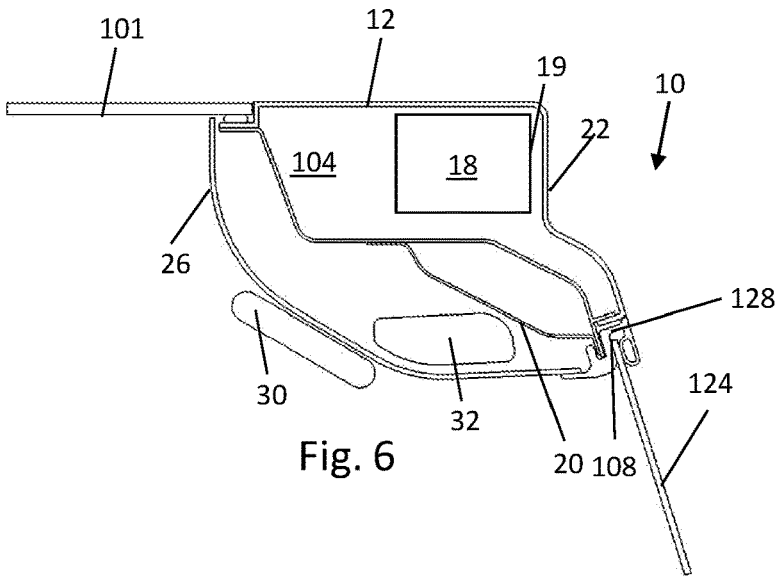
FIG. 6 is a schematic section view of a roof area of a motor vehicle having a roof module, the section view being perpendicular to a longitudinal vehicle direction.
Figure 7:
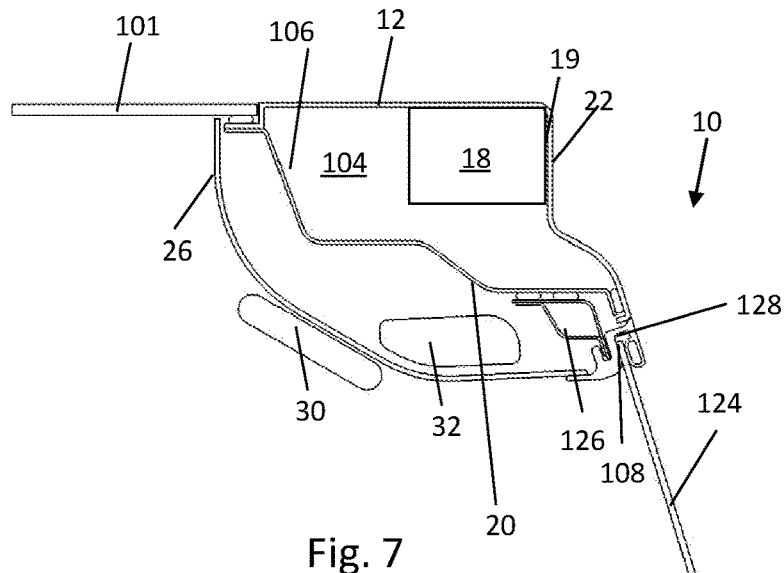
FIG. 7 is a second schematic section view of a roof area of a motor vehicle having a roof module, the section view being perpendicular to a longitudinal vehicle direction.
Figure 11:
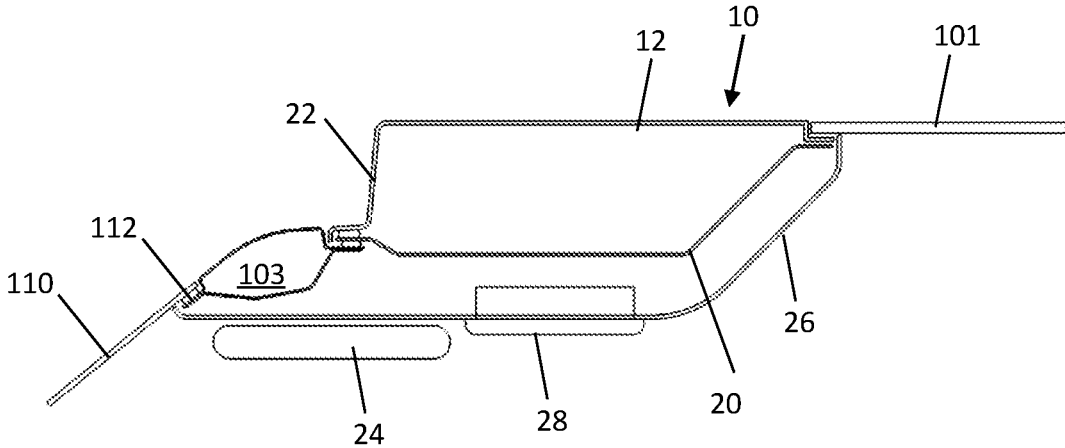
FIG. 11 is a schematic section view of a roof area of a motor vehicle having a roof module according to the state of the art, the section view being parallel to a longitudinal vehicle direction.

FIG. 6 shows a schematic section view of a roof area of motor vehicle 1000 with an exemplary embodiment of roof module 10 and a panoramic roof 101, the section view being perpendicular, in particular orthogonal, to a longitudinal vehicle direction x. In FIG. 6, unlike in the state of the art (see FIG. 11 for comparison), no vehicle body 103 is illustrated in the shown roof area since this part of vehicle body 103 is replaced with vehicle body rail 104 according to the invention, vehicle body rail 104 being comprised in roof module 10. Alternatively, vehicle body 103 can also comprise a simplified guide rail 126 in the area of the vehicle body rail (see FIG. 7). This guide rail 126 preferably has a guiding function when arranging roof module 10 on vehicle body 103 and serves as a rack and/or an installation aid, for example. Guide rail 126 preferably has no support function or a highly weakened support function compared to the other vehicle roof rails.

Figure 10:
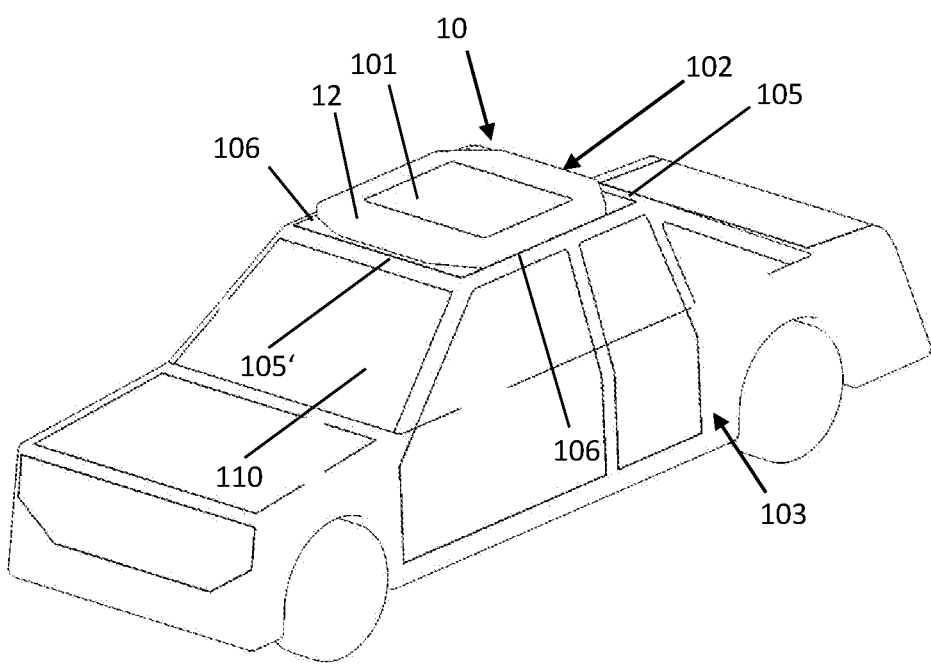
FIG. 10 is a schematic view of a motor vehicle having a vehicle body and a roof module according to the state of the art.

As can be seen in FIG. 6, vehicle body rail 104 is formed integrally by a roof module frame 20 of roof module 10. Panel component 12 is attached, in particular glued and/or foamed and/or injection-molded, to roof module frame 20. In the case at hand, the at least one environment sensor 18 is disposed on panel component 12 via housing 19 and looks through a see-through area 22, which is transparent to wavelengths used by environment sensor 18. According to FIGS. 6 and 7, environment sensor 18 looks in a direction perpendicular to the direction of travel, preferably parallel to a vehicle width direction. See-through area 22 is formed by panel component 12, in particular by a window in panel component 12. Vehicle body rail 104 has a hollow cross section. A flange portion 108 is formed on vehicle body rail 104. Flange portion 108 is configured in such a manner that a side window 124 is attached to it. According to FIGS. 6 and 7, side window 124 engages flange portion 108 via a weather strip 128 and can be opened and/or closed by means of a window opening system (not shown). As an example, a headliner 26 is disposed on roof module frame 20. A handle element 30 is disposed on headliner 26. Moreover, an airbag 32 is disposed between vehicle body rail 104 or longitudinal rail 106 and headliner 26. So, unlike in the state of the art, additional components and/or systems 26, 30 and 32 are not disposed on longitudinal rail 106 of closed roof frame 102 of vehicle body 103 (cf. FIGS. 10 and 11); instead they are disposed on vehicle body rail 104, which is comprised in roof module 10.

Figure 8:
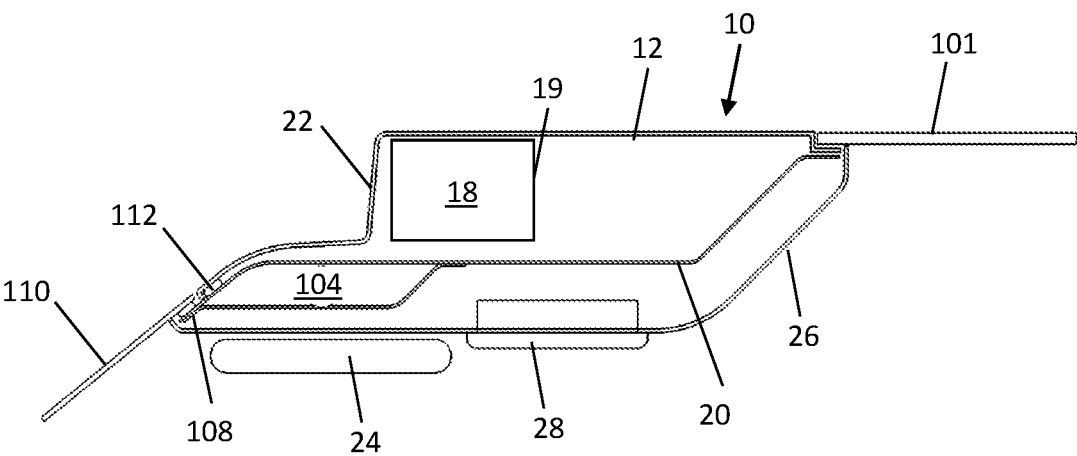
FIG. 8 is a schematic section view of a roof area of a motor vehicle having a roof module, the section view being parallel to a longitudinal vehicle direction.

FIG. 8 shows a schematic section view of a roof area of motor vehicle 1000 with an exemplary embodiment of roof module 10 and a panoramic roof 101, the section view being parallel to a longitudinal vehicle direction x. In FIG. 8, unlike in the state of the art (see FIG. 11 for comparison), no vehicle body 103 is illustrated in the shown roof area since this part of vehicle body 103 is replaced with vehicle body rail 104 according to the invention, vehicle body rail 104 being comprised in roof module 10. As shown in FIG. 8, vehicle body rail 104 is formed integrally by a roof module frame 20 of roof module 10. Panel component 12 is attached, in particular glued and/or foamed and/or injection-molded, to roof module frame 20. In the case at hand, the at least one environment sensor 18 is disposed on panel component 12 via housing 19 and looks through see-through area 22, which is transparent to wavelengths used by environment sensor 18. See-through area 22 is formed by panel component 12, in particular by a window in panel component 12. Vehicle body rail 104 has a hollow cross section. A flange portion 108 is formed on vehicle body rail 104. Flange portion 108 is configured in such a manner that a windshield 110, which is a front window according to FIG. 8, is attached to it. According to FIG. 8, windshield 110 is attached to flange portion 108 via a glue bead 112. As an example, a sun visor 24, headliner 26 and a roof operating unit 28 are disposed on roof module frame 20. In the case at hand, the sun visor is disposed on headliner 26, which is attached to roof module frame 20. Roof operating unit 26 is also disposed on, in particular inserted in, headliner 26. So, unlike in the state of the art, additional components and/or systems 24, 26 and 28 are not disposed on front transverse rail 105' of closed roof frame 102 of vehicle body 103 (cf. FIGS. 10 and 11); instead they are disposed on vehicle body rail 104, which is comprised in roof module 10.

Figure 9:
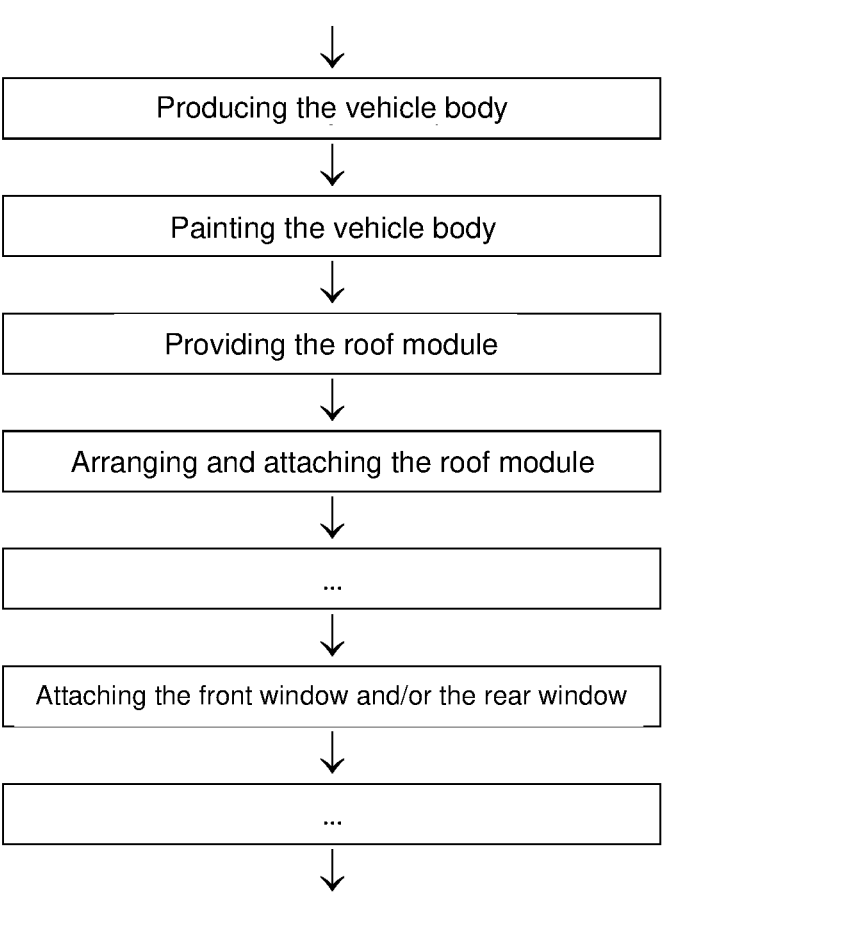
FIG. 9 is a flow diagram of an illustrative example of the method according to the invention.
Figure 12:
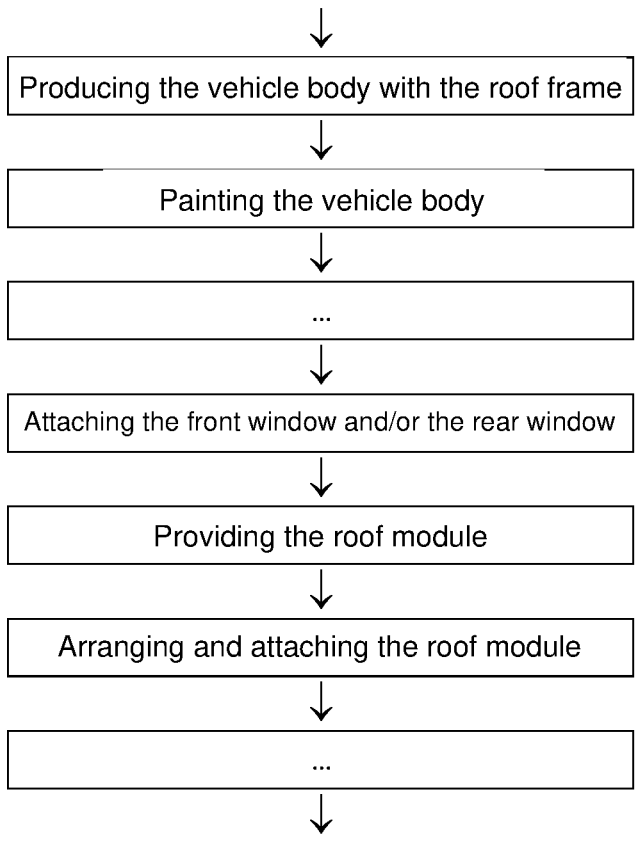
FIG. 12 is a flow diagram of a method for producing a motor vehicle according to the state of the art.

The constructive differences between roof module 10 according to the invention and the one according to the state of the art can be specified in particular by a comparison of the method according to the invention with a method for producing or assembling motor vehicle 1000 known from the state of the art (cf. flow diagrams of FIGS. 9 and 12).

The method according to the invention for assembling a motor vehicle 1000 comprises at least the following steps: providing and/or producing vehicle body 103, which comprises the at least one longitudinal rail 106, which forms at least a part of vehicle body roof frame 102; providing an embodiment of the roof module 10 according to the invention comprising the at least one vehicle body rail 104; arranging roof module 10 on vehicle body 103 in such a manner that the at least one vehicle body rail 104 and the at least one longitudinal rail 106 together form vehicle body roof frame 102; and attaching the at least one vehicle body rail 104 to the at least one longitudinal rail 106. Preferably, the method according to the invention comprises gluing the at least one vehicle body rail 104 to the at least one longitudinal rail 106. Preferably, the method according to the invention comprises attaching, in particular gluing, front and/or rear windshield 110 to vehicle body 103 and the at least one vehicle body rail 104. Unlike in the state of the art, roof module 10 is attached before windshield(s) 110 is/are attached to vehicle body 103 according to the invention since windshield(s) 110 is/are attached to flange portion 108 of vehicle body rail 104, which is comprised by roof module 10, according to the invention. Moreover, according to the invention, additional components and/or systems 24, 26, and 28 are preferably installed on roof module 10 before the latter is arranged on vehicle body 103. Thus, roof module 10 according to the invention is provided in an extensively pre-assembled state at the assembly line, which means that multiple work steps can be saved compared to the state of the art. Thus, the production process or the production method is optimized overall.

It is noted that the step of producing vehicle body 103 comprises providing vehicle body 103. Moreover, it is noted that other intermediate steps, which are not shown, can be comprised between the steps illustrated as examples in FIG. 9 and that the illustrated order of the individual steps is indicated as an example only and is not obligatory.

The invention claimed is:

1. A roof module comprising:
   a panel component which at least partially forms a roof skin of a vehicle roof, the roof skin serving as an outer sealing surface of the roof module, and
   at least one electrical and/or electronic and/or electromagnetic component, which has at least one environment sensor,
   wherein the roof module comprises at least one vehicle body rail configured to form at least part of a vehicle body roof frame when the roof module is disposed on a vehicle body,
   wherein the at least one vehicle body rail forms a front cross rail of the vehicle body roof frame when viewed in a vehicle longitudinal direction,
   wherein the at least one vehicle body rail is formed by the panel component, and
   wherein a front windshield is bonded to the vehicle body rail by glue.

2. The roof module according to claim 1, wherein the at least one vehicle body rail forms a front transverse rail of the vehicle body roof frame with respect to a longitudinal vehicle direction.

3. The roof module according to claim 1, wherein the at least one vehicle body rail forms a longitudinal rail with respect to a vehicle width direction.

4. The roof module according to claim 1, wherein the at least one vehicle body rail is welded and/or screwed and/or bolted and/or glued and/or foamed and/or injection-molded to at least part of the roof module or is formed integrally, by at least part of the roof module.

5. The roof module according to claim 1, wherein the at least one vehicle body rail is disposed directly or indirectly on the panel component, or the at least one vehicle body rail is disposed directly or indirectly on a roof module frame of the roof module and/or is formed by part of the roof module frame, or the at least one vehicle body rail is formed by the panel component.

6. The roof module according to claim 1, wherein the at least one electrical, electronic and/or electromagnetic component comprises an antenna and/or a measuring sensor and/or a communication feature and/or a light feature.

7. The roof module according to claim 1, wherein the module comprises at least one roof headliner and/or at least one handle element and/or at least one airbag and/or a roof operating feature, which is disposed on or integrated in the at least one vehicle body rail.

8. The roof module according to claim 1, wherein the roof module is disposed on a vehicle body as a structural unit.

9. A motor vehicle comprising: a vehicle body having at least one longitudinal rail and/or at least one transverse rail and/or a vehicle body sub-structure and a roof module according to claim 1, the at least one vehicle body rail being connected by being screwed and/or welded and/or glued and/or foamed and/or injection-molded, to the at least one longitudinal rail and/or the at least one transverse rail, which at least partially forms the vehicle body roof frame, and/or to the vehicle body substructure.

10. The motor vehicle according to claim 9, wherein the vehicle body roof frame of the vehicle body forms a closed frame structure when the roof module is disposed on the vehicle body.

11. A method for assembling a motor vehicle, the method comprising at least the following steps:

providing a vehicle body having at least one longitudinal rail and/or at least one transverse rail, which forms at least part of a vehicle body roof frame;

providing a roof module comprising a panel component which at least partially forms a roof skin of a vehicle roof, the roof skin serving as an outer sealing surface of the roof module, at least one vehicle body rail, and least one electrical and/or electronic and/or electromagnetic component, which has at least one environment sensor;

arranging the roof module on the vehicle body in such a manner that the at least one vehicle body rail and the at least one longitudinal rail and/or the at least one transverse rail together form the vehicle body roof frame;

attaching the at least one vehicle body rail to the at least one longitudinal rail and/or the at least one transverse rail;

attaching a front windshield and/or a side window to the vehicle body and the at least one vehicle body rail, the at least one vehicle body rail being formed by the panel component; and wherein the step of attaching a front windshield and/or a side window to the vehicle body and the at least one vehicle body rail is by gluing.

12. The method according to claim 11, wherein the attaching step comprises at least gluing the at least one vehicle body rail to the at least one longitudinal rail and/or the at least one transverse rail.

13. The method according to claim 11, wherein the method further comprises the step of pre-installing further technical systems and/or components on the roof module and/or the at least one vehicle body rail.

14. The roof module according to claim 2, wherein the at least one vehicle body rail that forms a front transverse rail of the vehicle body roof frame is a front header.

15. The roof module according to claim 3, wherein the at least one vehicle body rail forms a longitudinal rail is a longitudinal beam of the vehicle body roof frame with respect to a vehicle width direction.

16. The roof module according to claim 1, wherein the environment sensor is at least one of a lidar sensor, a radar sensor, a camera sensor, a multi-camera sensor and an ultrasonic sensor.

17. The method according to claim 13, wherein the step of pre-installing further technical systems and/or components on the roof module and/or the at least one vehicle body rail includes a headliner, at least one sun visor and/or a roof operating unit.

18. The roof module according to claim 1, wherein the vehicle body further comprises a non-supportive guide rail in an area of the at least one vehicle body rail, the non-supportive guide rail configured to act as an installation aid of the roof module onto the vehicle body.

* * * * *